Figure 1:
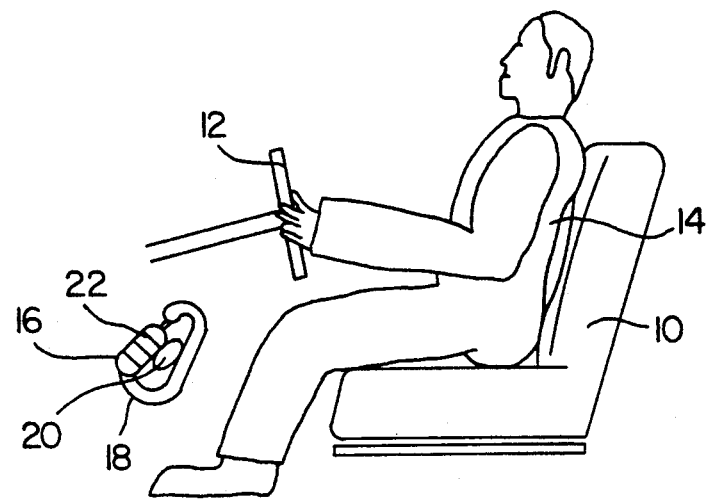

United States Patent [19]

Frank

[11] Patent Number: 5,156,416
[45] Date of Patent: Oct. 20, 1992

[54] SUPPORT TUBE FOR KNEEPADS

[75] Inventor: Simon Frank, Watterdingen, Fed. Rep. of Germany

[73] Assignee: Alusuisse-Lonza Services Ltd., Zurich, Switzerland

[21] Appl. No.: 526,729

[22] Filed: May 22, 1990

[30] Foreign Application Priority Data

May 30, 1989 [CH] Switzerland ............... 2027/89

[51] Int. Cl.$^5$ .............................................. B60R 21/04
[52] U.S. Cl. .................................. 280/751; 280/752
[58] Field of Search ................. 280/751, 752, 748

[56] References Cited

U.S. PATENT DOCUMENTS 4,400,011  8/1983  Matsuno ........................... 280/751

FOREIGN PATENT DOCUMENTS 2735141  2/1979  Fed. Rep. of Germany .
303252   5/1982  Fed. Rep. of Germany .
2157512  6/1973  France .
2416139  8/1979  France .
1467613  3/1977  United Kingdom .
2218385  11/1989  United Kingdom ................ 280/751

Primary Examiner—Kenneth R. Rice
Attorney, Agent, or Firm—Bachman & LaPointe

[57] ABSTRACT

The support tube for kneepads serves to promote the passive safety of occupants in a vehicle. The support tube of non-buckling construction consists of an integrally extruded tubular piece for the absorption of force. It has no doublings, is of round, oval or rounded-off construction and has at least one internal longitudinal web. The longitudinal web/webs of a support tube preferably mounted with a screw or plug-in connection in a passenger vehicle runs/run expediently approximately in the direction of the force effect to be expected.

13 Claims, 2 Drawing Sheets

SUPPORT TUBE FOR KNEEPADS

The invention relates to a support tube for kneepads serving to promote passive safety in a vehicle and also to the use o the support tube.

A support tube for kneepads is suitable for protecting, in the event of severe braking or a collision, vehicle occupants wearing two-point safety belts. During the crash, said vehicle occupant/occupants would slip under the belt and injure themselves. The kneepad functionally replaces the lap belt of a three-point belt.

In vehicles, in particular also in passenger vehicles, built-in support tubes for kneepads are known. Said tubes which are welded on to stable parts of the vehicle body consist essentially of an internal inner tube of circular cross-section and, pushed over it, an outer tube having two parallel longitudinal sides in the region of the support tube and with semicircular rounded-off cross-section on both sides. Inner and outer tube consist of steel and are welded to one another. The mounted support tube can be provided with a strengthening plate in the direction of the driver's seat. Furthermore, the support tube has a support and a mounting flange for kneepads.

In particular, the known support tubes for kneepads have the following disadvantages:

with two tubes inserted into one another, the force absorption declines with persistent deformation. The tube cross-section buckles at the beginning of the plastic deformation. Apart from the resulting increased distance from the knees to the protective support tube with kneepad, the opposing resistance after buckling is too small and the support tube is then further deformed.

Manufacture is costly, two tubes inserted into one another, various supports and flanges have to be welded together.

By using steel as the material and the construction of doublings or overlapping, the support tube is relatively heavy.

The inventor has set himself the object of providing a carrier tube of the type mentioned at the beginning which permits a largely unchanged absorption of force in the plastic deformation region, is easy to manufacture and secure in the motor vehicle and has a low weight.

In respect of the device, the object is achieved according to the invention in that the support tube of non-buckling construction consists of an integrally extruded tubular piece for the absorption of force, said tube having no doublings or overlapping, being of round, oval or rounded-off construction and having at least one internal longitudinal web.

The support tube is preferably constructed with elongate cross-section, two longitudinal sides running in parallel and then essentially semicircular arched pieces being constructed.

In such a support tube of elongate construction in respect of the cross-section, expediently two longitudinal webs running parallel to one another are constructed.

Expediently, the support tube has three integrally formed-on, internal screw channels for securing endface, shockproof suspension flanges.

For the manufacture of a support tube, all extrusion or injection-molding materials are suitable which have a sufficient mechanical strength and corrosion resistance. Particularly suitable are aluminum extrusion alloys, known per se, with the mentioned properties. With aluminum extrusion alloys, support tubes of the most complicated profile cross-section can be manufactured without problems.

The use according to the invention of the device occurs as a support tube, secured at both ends via a screw or plug-in connection, for a kneepad in a passenger vehicle, the longitudinal web/webs running approximately in the direction of the force effect to be expected. Thus, the force absorption is at an optimum, the longitudinal web or the longitudinal webs prevent a buckling of the outer tube int he plastic deformation region.

Preferably, the support tube is not only suspended in a shockproof manner at the endfaces but also supported in the longitudinal center. The efficiency is thus considerably increased with simple means because corresponding consoles for support are present in the longitudinal center of the support tube and thus also in the center of the vehicle.

The advantages in relation to the known state of the art can be summarized as follows:

the manufacture of the support tube by means of extrusion is simpler and more economical.

The tooling costs are low because only extrusion tools are required; other special production devices are not necessary.

The weight is low because no tubes inserted into one another, i.e. doublings are used and preferably an aluminum alloy is used as material.

The absorption of force is also high in the plastic deformation region because the support tube is constructed to be deformable in a buckle-free manner.

The assembly can occur without thermal connection, in particular without welding, by means of plugging-in or screwing.

With the preferred use of aluminum pressing alloys no surface protection is necessary.

Figure 2:
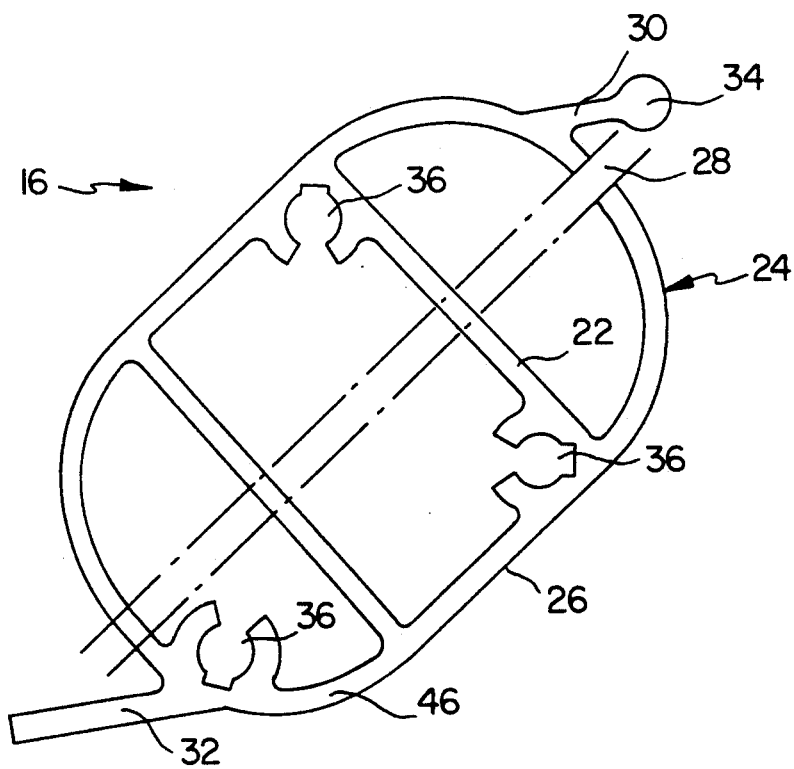
Figure 3:
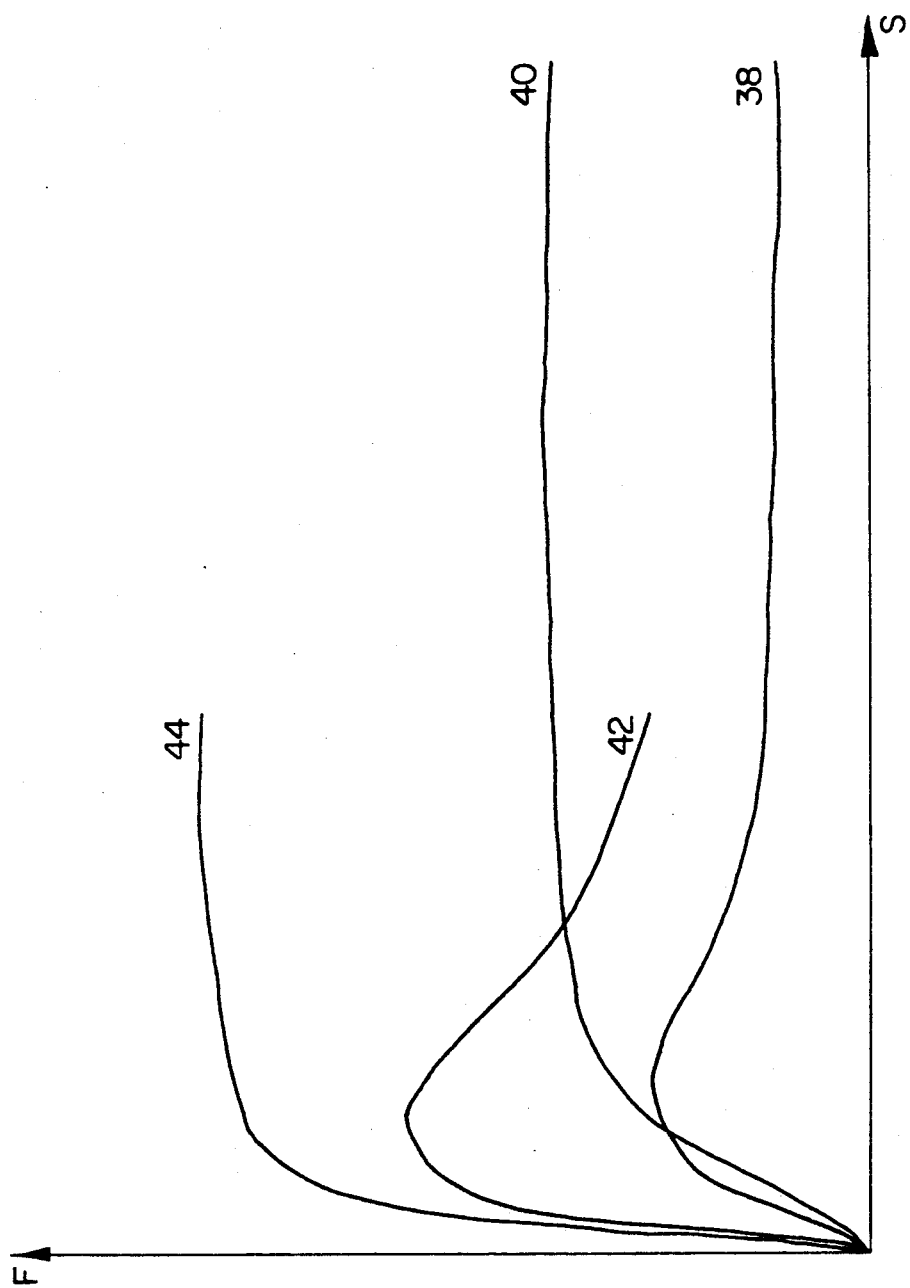

The invention is explained in greater detail with reference to the exemplary embodiments illustrated in the drawing. In the diagrammatic drawings:

FIG. 1 shows a view of a passenger vehicle driver and a section through a knee protection, FIG. 2 shows a section through a support tube, and FIG. 3 shows force path diagrams of various support tubes.

The passenger vehicle driver 14 sitting on a seat 10 at the steering wheel 12 is protected by a support tube 16 from being able to slide into the foot well of the passenger compartment of a passenger vehicle in the event of severe braking or an impact. Even after a short distance, his knees strike against the kneepad 18 secured on the support tube 16. A deformable crush tube 20 supports the kneepad 18 in its cushioning effect before the knees of the passenger vehicle driver 14 strike against the support tube 16 which is strengthened by three longitudinal webs 22. These longitudinal webs 22 mounted approximately in the impact direction of the knees prevent a buckling of the support tube 16.

In FIG. 2, a support tube 16 formed as an extruded profile from an aluminum alloy is shown in detail in cross-section. The outer wall 24 is of essentially rectangular construction with rounded-off corners. The longitudinal sides 26 are continuous with arched pieces 46, in each case two quarter circles being connected with narrow sides 28 by means of which essentially semicircular arched pieces arise. The longitudinal sides 26 and the narrow sides 28 each run parallel within the dot-dash lines.

At the transition of the longitudinal sides 26 into the arched pieces 46, there is in each case one internal longitudinal web 22 arranged which run vertical in relation to the longitudinal sides 26 and consequently are also parallel to one another. The longitudinal webs 22 are of plate-shaped construction and they have a regular or constant thickness approximately corresponding to the thickness of the outer wall 24.

In each case one flange 30, 32 projecting out at an acute angle is formed onto arched pieces 46 lying diagonally opposite one another. The upper flange 30 has a cylindrical head piece 34, into which an undercut suspension (not represented) for the kneepad 18 (FIG. 1) is turned. The kneepad is secured on the lower flange 32 by means of a screw.

Three internal screw channels 36 for securing endface, shockproof suspension flanges are likewise integrally formed onto the profile, said suspension flanges being designed in a known constructional form and therefore not illustrated.

The longitudinal webs 22 cannot be buckled in by the impacting knees of the passenger vehicle driver 14 (FIG. 1). The strengthening effect of the longitudinal webs 22 is greater the more perpendicular they are to the longitudinal sides 26.

In FIG. 3, the force F, for example in kN (kilonewton) is entered against the path s, for example in millimeters. The force is applied experimentally to various support tubes.

The diagram 38 shows the characteristics of the application of force in the center of a 1,290 mm long support tube consisting of two steel tubes inserted into one another according to the known state of the art. The force F to be used initially rises, exceeds a culmination point and then falls. In the culmination point the plastic deformation begins, the steel tubes inserted into one another are buckled and the absorption of force falls with increasing plastic deformation.

The diagram 40 shows the application of force to a support tube according to the invention and in accordance with FIG. 2 which is likewise 1,290 mm long. The application of force occurs, as when calculating the measured values relating to diagram 38, in the longitudinal center of the support tube. The cross-section of the support tubes upon which diagram 38 and 40 are based is approximately the same, likewise the wall thickness.

According to diagram 40, the absorption of force initially rises continuously in the region of elastic deformation and then flattens out into an approximately horizontally running curve which illustrates the plastic deformation.

The diagram 42 shows the application of force to a support tube, supported in the longitudinal center and in total likewise 1,290 mm long, consisting of two steel tubes lying inside one another, corresponding to the tube for diagram 38. The application of force occurs in a quarter of the length of the support tube. Diagram 42 runs essentially the same as diagram 38, however, at a higher load level because the free length of the loaded support tube is only half.

Diagram 44 shows the application of force to a support tube 16 according to the invention and in accordance with FIG. 2 which is supported in the center. As according to diagram 40, no decline in the force absorption capacity is to be detected in the plastic deformation region because no buckling of the longitudinal webs occurs.

The diagrams 38, 40, 42, 44 clearly show the higher efficiency of the present invention. Thanks to the internal longitudinal webs, in place of a second internal tube, the tube buckling can be avoided and thus a drastic reduction of the force absorption in the plastic deformation region can be avoided.

I claim:

1. Device for kneepads serving to promote passive safety in a vehicle, which comprises a support tube of non-buckling construction having an integrally extruded tubular piece for the absorption of force, said tubular piece having at least two internal longitudinal webs running parallel to one another and having a continuous oval cross-section with two parallel longitudinal sides and adjoining, essentially semicircular arched pieces, wherein the parallel longitudinal webs run approximately perpendicular to the longitudinal sides, and including integrally formed on flanges extending outwardly from the semicircular arched pieces.

2. Device according to claim 1 wherein the longitudinal webs are of plate-shaped construction of constant thickness.

3. Device according to claim 2 wherein the thickness of the webs approximately corresponds to the thickness of the longitudinal sides.

4. Device according to claim 1 wherein said flanges project out at an acute angle from the support tube for the purpose of receiving or securing kneepads.

5. Device according to claim 1 including at least three integrally formed-on screw channels for securing endface, shockproof suspension flanges.

6. Device according to claim 5 wherein said screw channels are situated internally of said support tube.

7. Device according to claim 1 consisting of a corrosion-proof aluminum extrusion alloy.

8. Device according to claim 1 including kneepads secured to said tube to promote passive safety in a passenger vehicle and to absorb force, wherein the at least one longitudinal web runs approximately in the direction of the force effect to be expected.

9. Device according to claim 8 including a deformable crush tube between the kneepad and the support tube.

10. Device according to claim 8 wherein said kneepad is secured to said flanges.

11. Device according to claim 1 having a single layer construction throughout the continuous oval cross-section thereof.

12. Device according to claim 1 including at least two of said flanges, with one extending from each of the two semicircular arched pieces.

13. Device according to claim 12 wherein at least one of said flanges includes a cylindrical bead piece.

* * * * *